No. 767,906.

Patented August 16, 1904.

UNITED STATES PATENT OFFICE.

JULIEN HENRI MERCADIER, OF LOUVRES, FRANCE.

PROCESS OF MANUFACTURING SPONGY LEAD.

SPECIFICATION forming part of Letters Patent No. 767,906, dated August 16, 1904.

Application filed April 2, 1904. Serial No. 201,339. (No specimens.)

*To all whom it may concern:*

Be it known that I, JULIEN HENRI MERCADIER, curate, a citizen of the Republic of France, residing at Louvres, Seine-et-Oise, in the Republic of France, have invented certain new and useful Improvements in Processes of Manufacturing Spongy Lead, of which the following is a specification.

This invention relates to a process for manufacturing spongy lead specially intended for the construction of electric accumulators, but which may also be used for any other manufacturing purpose, such as the purification of oils, &c.

This novel process consists in incorporating in a suitable manner a suitable metal oxid with molten lead when the latter is cooling. The mode of operation is as follows: A certain quantity of molten lead is located in a receptacle and then gently stirred by means of an iron fork—for instance, one preferably grown rusty—or a wooden fork or the like. This stirring is for the purpose of preventing the lead from thickening on and sticking to the walls of the receptacle. At the same time that the stirred lead is cooling it is powdered, and especially near the edges of the receptacle, with a metal oxid, such as litharge or minium or oxid of zinc or a mixture of these oxids. For certain applications other metal oxids and even ashes may be used. When the lead begins to become pasty, the receptacle is placed over a slight flame, and then begins the most important stage of the process of manufacture. During the whole of this stage the pasty mass of lead is stirred or, better still, kneaded by means of the stirrer, while the lead is being continuously powdered with the oxid or a mixture of oxids, which is located for that purpose in a box pierced with holes. The pasty lead thus closely mixed with the oxid cannot solidify in a compact mass. If the operation has been well performed, including the powdering, there is obtained when solidification has taken place a lump or mass of lead full of an infinite number of cavities and of veins, which render it extremely spongiose and capable of being rapidly penetrated by aquæ acidulæ. The lead is not in a state of powder, but of filaments, which are soldered together in leaving interstices between them. The lump of spongy lead thus obtained is so resisting that it does not become disaggregated even under the action of a rolling-mill. It can be put in the form of plates to serve as accumulator-plates, and in this case the use of an armature of ordinary or hardened lead is not necessary to give to the plates the required rigidity, for the spongy lead is sufficiently strong of itself.

In the preparation of the novel product in the manner described when the addition of oxid and the kneading are thought to be sufficient the matter is thrown quite hot into a mold in order to give it the desired shape or form.

If solidification comes on before the kneading is over, one has only to increase the intensity of the flame under the receptacle to again reduce the lead into a fluid state, and then the mixing and the kneading are progressively continued and completed.

In the application to electric accumulators the plates of spongy lead obtained by the present process do not require a long preparation and can be used almost immediately on being taken out of the mold, while giving at the same time excellent results, for the oxids which are formed within the mass of the plates are well maintained and do not become disaggregated.

I claim—

1. A process for the manufacture of spongy or porous lead, consisting in incorporating metal oxids with the lead when in a pasty state by powdering and kneading.

2. A process for the manufacture of spongy or porous lead, consisting in reducing lead to a liquid state by heating, in allowing it to cool gently, in continuously kneading and powdering the lead with a metal oxid while cooling.

3. The process of manufacturing spongy lead, consisting in incorporating metallic oxid with lead while the latter is in a state of fusion.

4. The herein-described product resulting from the incorporation of metallic oxid with lead while the latter is in a state of fusion.

In testimony that I claim the foregoing as my invention I have signed my name in presence of two subscribing witnesses.

JULIEN HENRI MERCADIER.

Witnesses:
CAMILLE DUBOIS,
MAURICE ROUX.